United States Patent
Stephens et al.

(10) Patent No.: US 6,678,699 B2
(45) Date of Patent: Jan. 13, 2004

(54) VISUAL INDEXING OF DISPLAYABLE DIGITAL DOCUMENTS

(75) Inventors: Mark Andrew Stephens, Northglenn, CO (US); Debra Kathleen Wagner, Louisville, KY (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 09/973,353

(22) Filed: Oct. 9, 2001

(65) Prior Publication Data

US 2003/0069895 A1 Apr. 10, 2003

(51) Int. Cl.[7] .............................................. G06F 17/30
(52) U.S. Cl. .................................................. 707/104.1
(58) Field of Search .............................. 707/103 R, 10, 707/104.1, 2, 3, 5, 205; 382/176, 219; 709/206, 229; 715/500, 513, 519, 523, 526, 542

(56) References Cited

U.S. PATENT DOCUMENTS

| | | | |
|---|---|---|---|
| 5,600,775 A | 2/1997 | King et al. ................. | 715/500 |
| 5,680,479 A | 10/1997 | Wang et al. ................. | 382/176 |
| 5,708,825 A | 1/1998 | Sotomayor ................ | 715/501.1 |
| 5,859,623 A | 1/1999 | Meyn et al. ................. | 345/730 |
| 5,983,171 A | 11/1999 | Yokoyama et al. ........... | 704/10 |
| 6,002,798 A | 12/1999 | Palmer et al. .............. | 382/176 |
| 6,067,553 A | 5/2000 | Downs et al. .............. | 707/523 |
| 6,205,549 B1 | 3/2001 | Pravetz ....................... | 713/182 |
| 6,457,017 B2 * | 9/2002 | Watkins et al. ......... | 707/103 R |
| 6,519,597 B1 * | 2/2003 | Cheng et al. ................. | 707/10 |

* cited by examiner

*Primary Examiner*—Diane D. Mizrahi
*Assistant Examiner*—Apu M Mofiz
(74) *Attorney, Agent, or Firm*—John R. Pivnichny

(57) ABSTRACT

A displayable digital document such as a .PDF document is indexed by displaying it on a viewer. A database field is provided in a relational database. A user selects a field in the digital document for indexing using a pointing device and defines a bounding rectangle for this field. Offsets are recorded and compared to other bounding rectangles. Comparisons are recorded in a parameter file for each document. An indexer is run to insert the offsets and other data into the relational database and also store the digital image in the relational database. A query is made of the database and part or all of the digital document is displayed based on the results of the query.

19 Claims, 1 Drawing Sheet

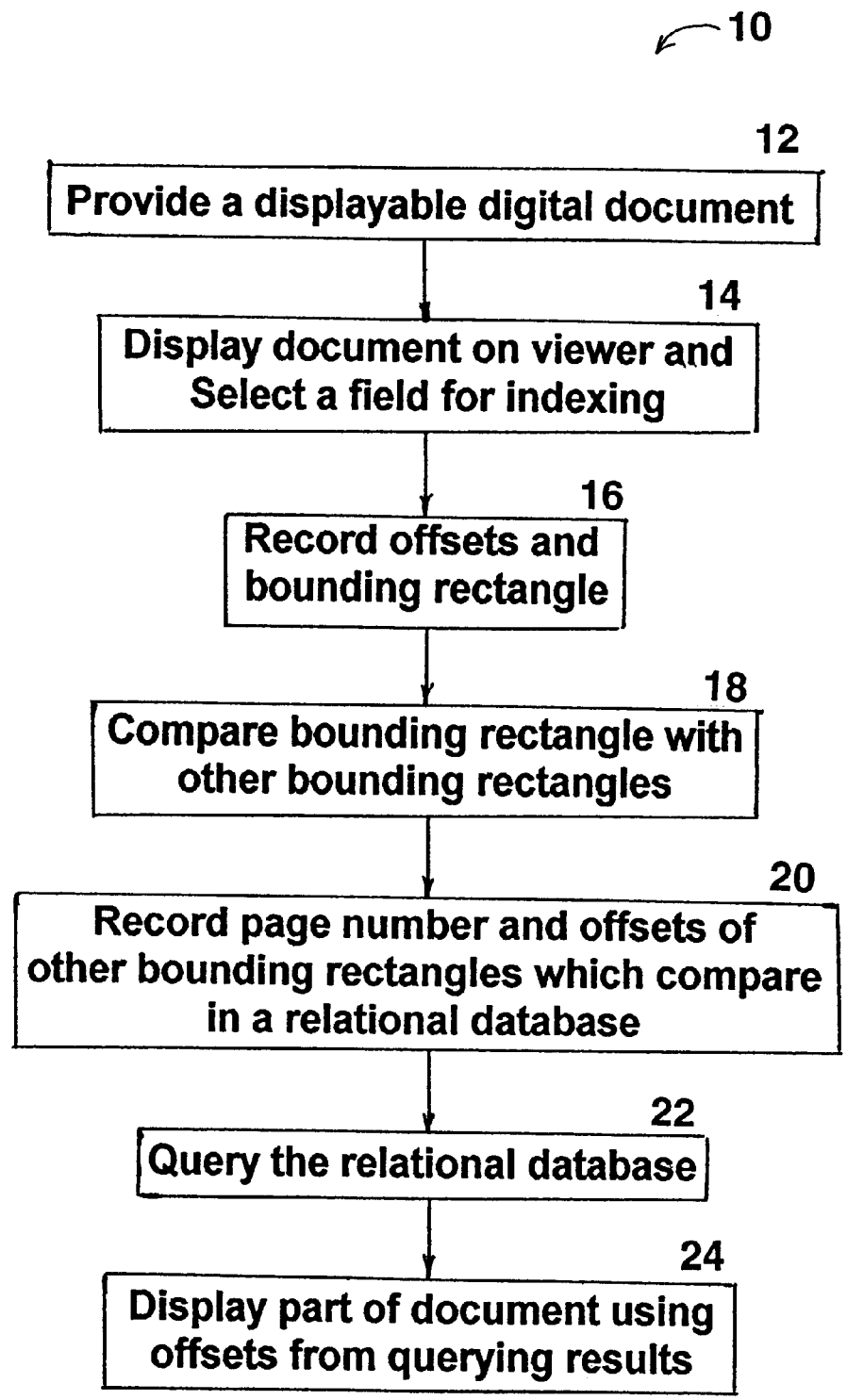

VISUAL INDEXING OF DISPLAYABLE DIGITAL DOCUMENTS

TECHNICAL FIELD

The invention relates to a method and apparatus for indexing the content of displayable digital documents and to a method and apparatus for querying and retrieving a portion of a displayable digital document using such an index.

BACKGROUND OF THE INVENTION

As increasingly large storage devices have become available it is now common practice to store documents in digitized form. For example a hardcopy document containing text and graphics may be digitized using a scanner into a bit map image and stored as a computer readable bit map file. Many other types of digitized formats are used including .PNG (Portable Network Graphics), .JPEG (Joint Photographic Experts Group), .GIF (Graphics Interchange Format) and .TIFF (Tag Image File Format). Other types of file formats capable of handling images and text such as .HTML (Hypertext Markup Language), and .PDF (Portable Document Format). Also commonly used and stored. Each of these formats can typically be displayed using a particular displayable digital document viewer software tool. Some tools are able to handle various formats and have the ability to convert from one to another.

Applications which store displayable digital documents have an advantage over older systems which stored documents simply as ASCII (American Standard Code for Information Interchange) text in that pictures, line art, images, graphs, tables, and other parts of the document are also stored and displayed. The term ASCII text as used herein shall include other text codes such as EBCDIC (Extended Binary Coded Decimal Interchange Code) text, BCD (Binary Coded Decimal) text, and equivalents including special codes for foreign language diacritical marks or different alphabets such as Cyrillic, Greek, Arabic, Armenian or Sanscrit. Indexing of such documents, in order to permit searching, browsing, and easy retrieval however, is a difficulty because index methods applied in the past to ASCII text documents does not work with these new formats. Various approaches have been tried to overcome this problem.

King et al. in U.S. Pat. No. 5,600,775 describe an indexing scheme to allow multimedia developers to change data in a vast file such as a full motion video. Individual frames of video are annotated with text, graphics, hand drawn images, and digital audio without modification to the original video information. The video data and annotations are stored separately. The annotations are related to a particular video frame by an index such as a frame video timing parameter.

Sotomayor in U.S. Pat. No. 5,708,825 describes an indexing method for text data. The method uses weighting rules to determine from the textual data what are the most significant phrases. Various types of summary pages are generated including key-topic index entries and hyperlinks to pages where the key-topics appear.

Yokoyama et al. in U.S. Pat. No. 5,983,171 describe a method of automatically compiling an index of a text document. Words and phrases are extracted using a word or phrase analysis program. The respective locations of the words or phrases in the document are also extracted at the same time. A user inputs an indexing object extraction condition. Words and phrases previously extracted are registered into an index candidate dictionary based to relevance to the indexing object extraction condition. Finally, an index is compiled using the index candidate dictionary.

Palmer et al. in U.S. Pat. No. 6,002,798 describe a method for creating an index for storage and retrieval of document images. A document image is obtained by scanning an original document. The structure of the document is determined by conventional block selection techniques which utilize a rule-based knowledge system for identifying specific areas in a document and for determining the content of the image within those areas so that the document image is decomposed into a general set of objects. One block selection technique is described in U.S. Pat. No. 5,680,479 by Wang et al. U.S. Pat. No. 6,002,798 filed Jan. 19, 1993 by Palmer et al. and U.S. Pat. No. 5,680,479 filed Apr. 24, 1992 by Wang et al. are hereby incorporated by reference in their entirety. The structure is stored along with the document. A retrieval index may be created by using the block selection techniques to identify areas of first type e.g. title areas. The areas are converted to text by optical character recognition (OCR) techniques. The converted text is then indexed to form the retrieval index which is stored together with the document image.

Downs et al. in U.S. Pat. No. 6,067,553 describe a method of re-organizing the data in a .PDF file in order to permit a user to view parts of the file before the entire file is loaded. By repeatedly accessing a recognition look-up table and dynamically updating an object definition look-up table, a graphics processor may display contents of a file as they arrive, rather than after the entire contents have been received.

Despite the foregoing developments a satisfactory method of indexing displayable digital documents in a relational database remains a problem. In accordance with the present invention, there is defined a new method and system of indexing such documents into a relational database. It is believed that such a method and system constitutes a significant advancement in the art.

OBJECTS AND SUMMARY OF THE INVENTION

It is therefore a principal object of the present invention to enhance the indexing art by providing a method of indexing a displayable digital document with enhanced capabilities.

It is another object to provide such a method having enhanced querying and retrieval capabilities.

It is a further object to provide a system with enhanced indexing capabilities.

It is yet another object to provide a computer program product capable of indexing a displayable digital document with enhanced capabilities.

These and other objects are attained in accordance with one embodiment of the invention wherein there is provided a method of indexing a displayable digital document, comprising the steps of, providing a displayable digital document, displaying the document with a displayable digital document viewer and selecting a field for indexing using a pointing device, recording offsets and a bounding rectangle of the selected field, comparing the bounding rectangle with other bounding rectangles in the displayable digital document, and recording in a relational database, a page number and offsets of the other bounding rectangles which compare.

In accordance with another embodiment of the invention there is provided a method of indexing a displayable digital document, comprising the steps of, providing a displayable digital document having one or more document fields, providing a database field in a relational database, displaying the document with a displayable digital document viewer and selecting one of the document fields for indexing corresponding to the database field, using a pointing device, recording offsets and a bounding rectangle of the selected field, comparing the bounding rectangle with other bounding rectangles in the displayable digital document, and recording in a relational database, a page number and offsets of the other bounding rectangles which compare.

In accordance with yet another embodiment of the present invention there is provided a system for indexing a displayable digital document, comprising, a displayable digital document, a displayable digital document viewer having a pointing device, the viewer adapted for selecting a field of the displayable digital document for indexing using the pointing device, means for recording offsets and a bounding rectangle of the selected field, means for comparing the bounding rectangle with other bounding rectangles in the displayable digital document, and means for recording in a relational database, a page number and offsets of the other bounding rectangles which compare.

BRIEF DESCRIPTION OF THE DRAWINGS

The FIGURE is a flowchart depicting an embodiment of the present invention.

BEST MODE FOR CARRYING OUT THE INVENTION

For a better understanding of the present invention, together with other and further objects, advantages, and capabilities thereof, reference is made to the following disclosure and the appended claims in connection with the above-described drawing.

In the FIGURE there is shown a flowchart 10 of a method of indexing a displayable digital document. In step 12 a displayable digital is provided. In one embodiment the document is stored in .PDF format. The document has one or more fields. For example, the document may be a purchase order form received from a customer in either hardcopy or digital form. If hardcopy, the form is digitized using a scanner or other means. The purchase order form may have a field for purchase order number, and other fields for data relating to the items to be purchased such as part number, quantity, price, color, etc. Corresponding field names may be entered in a relational database such as a DB2® database (DB2 is a registered trademark of International Business Machines Corporation).

In step 14 the digital document is played on a viewer. One well known viewer for .PDF documents comprises running the Adobe ACROBAT® READER® software on a personal computer having a display screen. (ACROBAT and READER are trademarks of Adobe Systems, Inc.). A user selects a field on the displayed digital document by recording offsets and a bounding rectangle of the displayed field in step 16. Offsets define the location of the bounding rectangle on the digital document by for example specifying the horizontal and vertical distances from the upper left corner of the document to the upper left corner of the selected bounding rectangle. It will be obvious to one of ordinary skill in the art that the selecting step is greatly facilitated using mouse or other pointing device guided software to highlight or outline the selected rectangle e.g. by clicking in an outlined area and record the rectangle and offset data.

The bounding rectangle is compared with other bounding rectangles in step 18. In one embodiment this comparing determines whether any bounding rectangle overlaps the selected bounding rectangle. Overlap is herein defined to include any type of overlap up to and including a single pixel e.g. a corner point of one rectangle overlaps a corner point of a second rectangle. Overlapped rectangles are highlighted or outlined on the display so the user can decide whether or not to modify his selected rectangle to include each therein. The other rectangles may include bounding rectangles for any object on the digital document as well as previously selected bounding rectangles.

In step 20 the page number and offsets of a further bounding rectangle which encompasses the selected fields is recorded in the relational database either by default or if so decided as described above. For example, purchase order number field bounding rectangle offsets may be recorded in a purchase order number field of the relational database. In this example the user is finding fields in the document which match the field names in the relational database.

One way of recording the page number and offsets in the relational database is to build a parameter file of such page numbers and offsets for each document. Then an indexer application is run to read in the parameter files and enter the parameter file data into appropriate fields in the relational database. The parameter data may also be added to the file where the digital document is stored or the digital image is placed in the relational database.

Having indexed the document, a query may be made of the relational database. For example if the database is a DB2 database, then a query language such as SQL (structured query language) may be used. The query may be made using ASCII text. In step 24 the results of the query are used to display part or all of a displayable digital document. This display of the document corresponds to the parameter files data entered into the relational database. For example, a user may have selected a bounding rectangle for an area of a document containing an account number for a customer to which a company sends utility bills. A parameter file is built defining the selected field to be from position x1, y1 to position x2, y2 where x and y represent horizontal and vertical offsets from a starting point. The account number would then be highlighted when viewing a document having one in this field. The indexer application takes the parameter file and extracts data from the document file that lies within the bounding rectangle and loads that information into a relational database along with the document itself. The user can then issue a query for a particular account number and the index stored in the database would say that this account number resides in a certain document on certain pages which are at a certain byte offset and retrieves this information along with the bounding rectangle used to index this information, and displays it to the user on a screen. The user can thereby see the customer information with appropriate fields highlighted. Some or all of the part, or all of the displayed digital document may be highlighted or outlined.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of indexing a displayable digital document, comprising the steps of:

providing a displayable digital document;

displaying said document with a displayable digital document viewer and selecting a field for indexing using a pointing device;

recording offsets and a bounding rectangle of said selected field;

comparing said bounding rectangle with other bounding rectangles in said displayable digital document; and recording in a relational database, a page number and offsets of said other bounding rectangles which compare.

2. The method of claim 1, wherein said displayable digital document is a .PDF document.

3. The method of claim 1, wherein said pointing device is a mouse.

4. The method of claim 3, further comprising selecting an index value by clicking said mouse button in an outlined area.

5. The method of claim 1, wherein said relational database is a DB2 database.

6. The method of claim 1, further comprising the steps of:

querying said relational database; and using retrieved offsets from said querying to display a portion of said displayable digital document using said displayable digital document viewer.

7. The method of claim 6, wherein said relational database is a DB2 database.

8. The method of claim 7, wherein said querying is performed using the SQL language.

9. A method of indexing a displayable digital document, comprising the steps of:

providing a displayable digital document having one or more document fields;

providing a database field in a relational database;

displaying said document with a displayable digital document viewer and selecting one of said document fields for indexing corresponding to said database field, using a pointing device;

recording offsets and a bounding rectangle of said selected field;

comparing said bounding rectangle with other bounding rectangles in said displayable digital document; and recording in a relational database, a page number and offsets of said other bounding rectangles which compare.

10. A system for indexing a displayable digital document, comprising:

a displayable digital document;

a displayable digital document viewer having a pointing device, said viewer adapted for selecting a field of said displayable digital document for indexing using said pointing device;

means for recording offsets and a bounding rectangle of said selected field;

means for comparing said bounding rectangle with other bounding rectangles in said displayable digital document; and means for recording in a relational database, a page number and offsets of said other bounding rectangles which compare.

11. The system of claim 10, wherein said displayable digital document is a PDF document.

12. The system of claim 10, wherein said pointing device is a mouse.

13. The system of claim 10, further comprising means for selecting an index value by clicking a button of said mouse in an outlined area.

14. The system of claim 10, wherein said relational database is a DB2 database.

15. The system of claim 10, further comprising:

means for querying said relational database; and means for using retrieved offsets from said querying to display a portion of said displayable digital document using said displayable digital document viewer.

16. The system of claim 15, wherein said relational database is a DB2 database.

17. The system of claim 16, wherein said means for querying comprises the SQL language.

18. A computer program product for instructing a processor to index a displayable digital document, said computer program product comprising:

a computer readable medium;

first program instruction means for providing a displayable digital document;

second program instruction means for displaying said document with a displayable digital document viewer and for selecting a field for indexing using a pointing device;

third program instruction means for recording offsets and a bounding rectangle of said selected field;

fourth program instruction means for comparing said bounding rectangle with other bounding rectangles in said displayable digital document; and fifth program instruction means for recording in a relational database, a page number and offsets of said other bounding rectangles which compare; and wherein all of said program instruction means are recorded on said medium.

19. The computer program product of claim 18, further comprising sixth program instruction means for querying said relational database, and seventh program instruction means for using retrieved offsets from said querying to display a portion of said displayable digital document using said displayable digital document viewer.

* * * * *